United States Patent

[11] 3,576,995

[72] Inventors Joseph C. Nirschl
West Long Branch;
G. Edgar Mooney, Jr., Point Pleasant, N.J.
[21] Appl. No. 780,505
[22] Filed Dec. 2, 1968
[45] Patented May 4, 1971
[73] Assignee The United States of America as represented by the Secretary of the Army

[54] RADIATION SURVEY METER COUNTING LOSS COMPENSATION CIRCUIT
3 Claims, 3 Drawing Figs.
[52] U.S. Cl. .................................................. 250/83.3, 250/83.6
[51] Int. Cl. .................................................. G01t 1/16
[50] Field of Search ....................................... 250/83.3, 83.6, 83.6 (A)

[56] References Cited
UNITED STATES PATENTS
3,234,384 2/1966 Friedling et al............... 250/83.6X
3,366,791 1/1968 Markow....................... 250/83.3X Primary Examiner—James W. Lawrence
Assistant Examiner—Davis L. Willis
Attorneys—Harry M. Saragovitz, Edward J. Kelly, Herbert Berl and Daniel D. Sharp ABSTRACT: A radiation survey meter including a radiation detector, an operational amplifier and a current meter in the output circuit thereof wherein the counting loss error of the detector, which causes a reduction in current at high dose rate levels, is compensated for by means of a Zener diode connected in circuit with a resistive network in the output circuit of the operational amplifier. For higher radiation dose levels, the output voltage of the operational amplifier exceeds the voltage at which the Zener diode starts conducting. The resulting impedance change in the output circuit causes additional current flow in the current meter. By proper selection of a Zener diode and the resistance network associated therewith, the dead time effect of the radiation detector can be adequately compensated for.

INVENTORS,
JOSEPH C. NIRSCHL &
G. EDGAR MOONEY JR.

BY: *Daniel A. Sharp*
*Harry M. Saragovitz,*
*Edward J. Kelly & Herbert Berl*

ATTORNEYS.

RADIATION SURVEY METER COUNTING LOSS COMPENSATION CIRCUIT

BACKGROUND OF THE INVENTION

Radiation survey meters used for detecting and measurement of various types of environmental nuclear radiation frequently contain Geiger-Mueller tubes as the detecting element. When such tubes are used with a scaler or counting rate meter to measure a photon or particle flux, a phenomenon is encountered which effects the accuracy of the radiation dose rate measurement. This phenomenon is usually referred to as counting loss or dead time loss and results from the fact that the Geiger-Mueller tube, upon initiation of the Townsend avalanche by a primary ionizing event, remains insensitive to new events for an appreciable period of time $\tau_d$, called the dead time. This dead time may be typically of the order of 100 to 150 microseconds and is ordinarily much longer than the time required by the pulse circuitry of the dose rate meter to properly process the detector tube pulses.

It can be shown that the true counting rate, N, which would be obtained with an ideal detector ($\tau_d=0$ or very small) is related to the counting rate $n$ actually observed with a physically realizable Geiger-Mueller tube by the expression $$N=\frac{n}{1-n\tau_d} \quad (1)$$

which can also be written as $$\frac{n}{N}=1-n\tau_d \quad (2)$$

the relationship of equation (2) permits a convenient estimate of the percentage error owing to dead time losses. From equation (2) it is evident that this percentage error can become appreciable at high counting rates $n$. For example, a Geiger-Mueller tube with $\tau_d$ approximately equal to 100 microseconds registering a counting rate $n$ of 1,000 pulses per second, is subject to an inherent error of $n\tau_d=10^3 \times 10^{-4}=0.1$ or 10 percent.

This counting loss error causes an undesirable curvature of the Geiger-Mueller tube response as a function of the particle or photon flux incident on the tube, with an increasing error towards the high end of the range, and eventual saturation of the tube or continuous discharge. In order to use Geiger-Mueller tubes over a wide dynamic range and measurement of, for example, Gamma radiation, two techniques previously have been used in radiation survey meters. One technique involves use of two or more tubes of different size, gas content and geometry, with appropriate switching means so that each tube works in its linear range (the smaller tube covering the higher range). This requirement of multiple tubes adds to the bulk and cost of the survey meters. The second approach has been one of intermittent application of the tube operating voltage, that is pulsed operation. This technique generally involves fast pulse circuitry and results in a nonlinear scale factor of the readout meter.

SUMMARY OF THE INVENTION

In accordance with the invention, the range of linear operation of the detector tube is extended by at least a decade, with very little additional circuitry. Essentially, the compensation technique takes advantage of the relatively high signal voltage and low source impedance available at the output of an operational amplifier pulse rate meter. This allows the insertion of a low voltage Zener diode in the output circuit of the operational amplifier to modify the meter current as a function of the output voltage of the operational amplifier. By proper selection of a Zener diode and associated resistor network for a given detector tube response, almost perfect compensation can be achieved for the dead time loss of the detector tube. The meter current is substantially unaffected for lower and intermediate output voltages of the operational amplifier, corresponding to the linear portion of the Geiger-Mueller tube response. However, as the operational amplifier output voltage increases beyond a certain value, corresponding to the radiation dose rate level at which nonlinearity commences, the Zener diode starts conduction and the impedance of the network in the output circuit of the operational amplifier changes and the meter current changes correspondingly, to produce an essentially linear response (current vs. dose rate).

DETAILED DESCRIPTION OF THE PREFERRED EMBODIMENT

Figure 1:
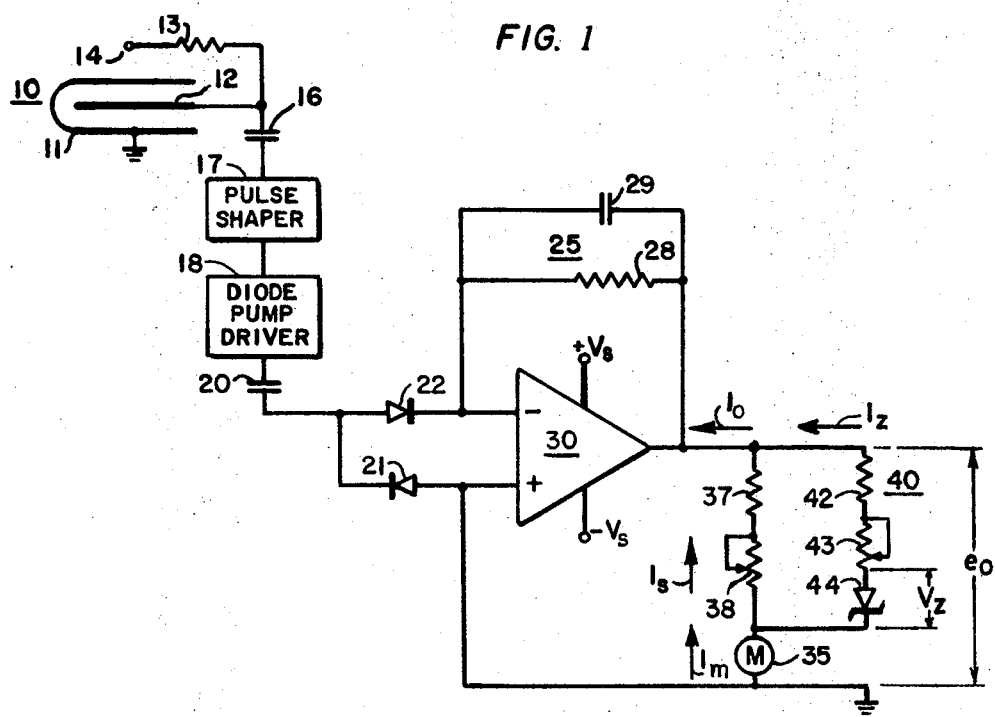
FIG. 1 is a circuit diagram showing an embodiment of the invention.

Referring to FIG. 1 a radiation survey meter is shown for measuring dose rate. The survey meter includes a radiation detector 10 such as a Geiger-Mueller tube. The envelope 11 of the Geiger-Mueller tube may be grounded and the central electrode 12 connected through a supply resistor 13 to a high voltage terminal 14. In the presence of nuclear radiation, a series of pulses is derived from the detector tube 10 and the number of pulses occurring within a given time interval is directly proportional to the radiation dose rate, normally expressed in millirads per hour. The pulses from the detector tube 10 are coupled by way of a capacitor 16 to a pulse shaping circuit 17 whose function is to generate normalized pulses of constant amplitude and duration for all Geiger-Mueller tube pulses received. Such a pulse shaping circuit may, for example, be a monostable multivibrator. The shaped pulses, after amplification in a diode pump driver 18, are applied to a coupling capacitor 20. The direct current pulses from the driver 18 charge the capacitor 20 through diode 21 to a voltage corresponding to the pulse amplitude V, thus imparting a charge $Q=C \cdot V$ onto this capacitor, with each pulse arriving from the Geiger-Mueller tube. Through the action of diode 22 this charge is applied to the tank capacitor 29 in the feedback network of the operational amplifier, with shunt resistor 28 providing a leakage path. It can be shown that, for a constant rate $n$ of arrival of pulses the output voltage $e_0$, of the operational amplifier is approximately $e_o \approx C_c \cdot R_t \cdot V$     (3) The dampening characteristics of the rate meter (statistical fluctuations) depend on the time constant $R_t C_t$. The amount of current $I_m$ flowing through the meter will be a function of the pulse repetition rate from the detector 10 and, consequently, dependent upon the radiation dose rate. The feedback network 25 of the operational amplifier provides the necessary time constant for stabilizing the current pulses to provide an average current.

As the pulse repetition rate increases, the output voltage $e_o$, of the amplifier 30 increase in a negative direction. In other words, the output current $I_o$, with the portion of that current going through the meter 35, designated as $I_m$, is a function of the pulse repetition frequency and, indirectly, of the radiation dose rate. The fixed resistor 37 and the potentiometer 38 in series with the meter 35 provide the necessary calibration resistance for the meter and take care of variations in the particular current meter inserted in the operational amplifier output circuit.

In accordance with the invention, a compensating network 40 is inserted in the output circuit of the operational amplifier 30. This compensating network includes a fixed resistor 42, a potentiometer 43 and a Zener diode 44. This network 40 is connected in shunt with the calibration resistance network 37, 38.

The Zener diode 44 is placed in the output circuit of the operational amplifier across the aforesaid calibration network 37, 38. The Zener diode can be chosen to commence conduction at a voltage $e_o$ corresponding to the dose rate R and the impedance of this Zener diode will suddenly decrease at this level. The decreased resistance of the compensating diode 44 will obviously decrease the effective resistance in shunt with the calibration resistance 37, 38 and the meter current $I_m$ will increase. If the voltage $e_o$ presented to the Zener diode further increases, the resistance of the Zener diode decreases rapidly and the Zener current would increase with increasing voltage. The resultant resistance of the output circuit would decrease with further increase in the voltage $e_o$. The effect of such a circuit may well overcompensate for the dead time. The decrease of overcompensation achieved would depend upon the characteristics of the Zener diode 44. Proper compensation can be achieved by current limiting by means of an additional resistor in series with the Zener diode 44 (e.g. resistors 42 and 43). This combination of Zener diode resistance and the resistance offered by resistors 42 and 43 enable nearly exact compensation for the dead time at high radiation intensities exceeding the value $R_c$.

For a given Zener diode, the relationship between the Zener (compensation) current $I_z$ through the resistance $R_s$ (resistors 42 and 43 of FIG. 1) in series with the Zener diode and the Zener voltage can be stated as $I_z = f(V_z)$ (4)

The output voltage $e_o$ of the operational amplifier is given by
$$e_0 = I_z \cdot R_s V_z + V_m \quad (5)$$
where $V_m$ is the voltage across the meter terminals The voltage $V_m$ can be given by
$$V_m = (I_s + I_z)R_m \quad (6)$$
where $R_m$ is the meter resistance (i.e. internal resistance of meter 35) and $I_s$ the signal current through the calibration resistance $R_k$ (combination of resistors 37 and 38).

Now
$$I_s = \frac{e_0}{R_m + R_k} \quad (7)$$

Combining the equations, 4, 5 and 6, one can solve for $V_z$ $$V_z = e_0 \left(1 - \frac{R_m}{R_m + R_k}\right) - I_z(R_m + R_s) \quad (8)$$

$$V_z = k e_0 - I_z(R_m + R_s) \quad (9)$$

where
$$k = 1 - \frac{R_m}{R_m + R_k} \quad (10)$$

Equation 10 expresses the relationship between the Zener diode characteristic and the pertinent circuit parameters.

Figure 2:
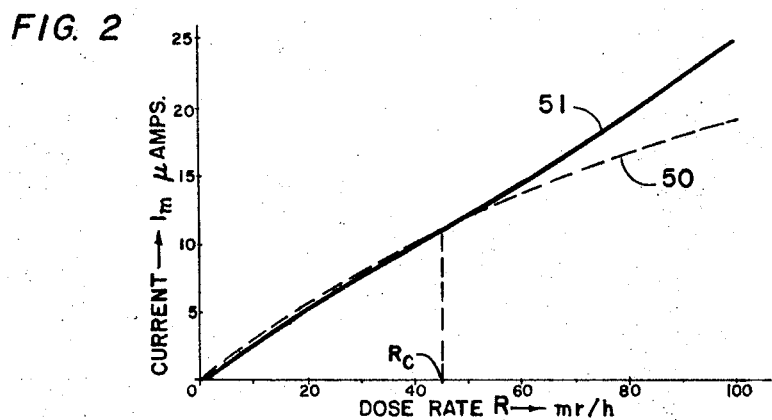
FIG. 2 represents current vs. radiation dose rate curves with and without the compensation network shown in FIG. 1.

The dashed curve 50 of FIG. 2 indicates a typical relationship between meter current, in microamperes, and the radiation dose rate, in millirads per hour, obtained in the absence of a compensating network in the output circuit of the operational amplifier 30. The inability of the detector tube 10 to respond linearly to pulses beyond a certain repetition rate, corresponding to high dose rates, is manifested by the drooping characteristic beyond a certain dose rate $R_c$. This dashed curve 50, in other words, is the curve for a survey meter which includes only the meter 35 and calibrating resistance network 37, 38. The solid line 51 of FIG. 2 represents the response when the compensating network 40 is included. It will be noted that, although, the solid curve is substantially coextensive with the dashed curve 50 for lower and intermediate values of dose rate, the portion of the dashed curve at higher dose rates, as a result of the compensation network, is altered toward increasing response, as indicated by the solid curve 51. In this manner, the overall response of the instrument calibration is linearized.

Figure 3:
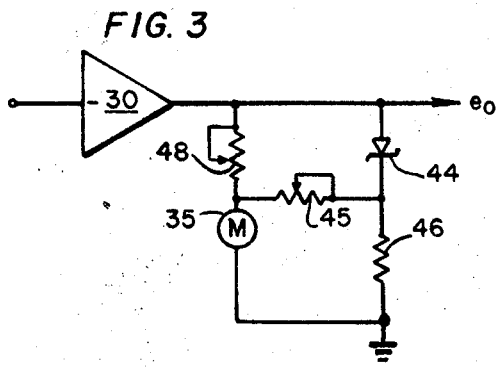
FIG. 3 shows a modification of the compensation circuit illustrated in FIG. 1.

An alternate circuit arrangement which is sometimes advantageous is shown in FIG. 3. It permits operation of the Zener diode at higher currents. In this circuit, which replaces the output circuit of FIG. 1, a variable resistor 45 is connected between the junction of the meter 35 and calibration resistor 48. The resistor 48 is equivalent to the combined resistors 37 and 38 of FIG. 1 since the potentiometer 38 may be changed in size to include the magnitude of the fixed resistance 37. This configuration allows the Zener diode to pass a higher current, since some of the current is shunted to ground via resistor 46. The derived amount of compensation current through the meter 35 can be adjusted by means of variable resistor 45.

We claim:

1. A radiation survey meter comprising a nuclear radiation detecting means for producing pulses at a rate dependent upon the radiation dose rate, said detecting means being characterized by a counting loss at high levels of radiation dose rate, an operational amplifier for amplifying the pulses generated by said detecting means and producing a current in the output circuit thereof which is representative of the pulse repetition frequency of said detecting means, an indicating current meter through which said output current flows for indicating the radiation dose rate, and a voltage sensitive compensating network connected in the aforesaid output circuit for decreasing the impedance in series with said meter as a function of said output voltage when the output voltage of said amplifier exceeds a predetermined value to obtain a substantially linear meter deflection for a decreasing pulse rate which exists when the detector is exposed to said high levels of radiation dose rate, said compensating network including a resistive means and a Zener diode connected in series with said detecting means, , Zener diode being rendered conducting when said predetermined voltage value is attained.

2. A radiation survey meter as recited in claim 1 wherein said current meter is connected in series with an adjustable calibration resistive means and said compensating network is connected in shunt with said calibration resistive means.

3. A radiation survey meter comprising a nuclear radiation detecting means for producing pulses at a rate dependent upon the radiation dose rate, said detecting means being characterized by a counting loss at high levels of radiation dose rate, an operational amplifier for amplifying the pulses generated by said detecting means and producing a current in the output circuit thereof which is representative of the pulse repetition frequency of said detecting means, an indicating current meter through which said output current flows for indicating the radiation dose rate, a compensating network connected in the aforesaid output circuit for increasing the current flow through said meter when the output voltage of said amplifier exceeds a predetermined value, said compensating network including a resistive means and a Zener diode, said Zener diode being rendered conducting when said predetermined voltage level is attained, a calibration resistor in circuit with said indicating meter, and a resistor connected between the junction of said Zener diode and said resistive means and the junction of said calibration resistor and said indicating meter.